Oct. 12, 1948.  L. F. PRICE  2,451,117
PULLING APPARATUS
Filed July 30, 1945
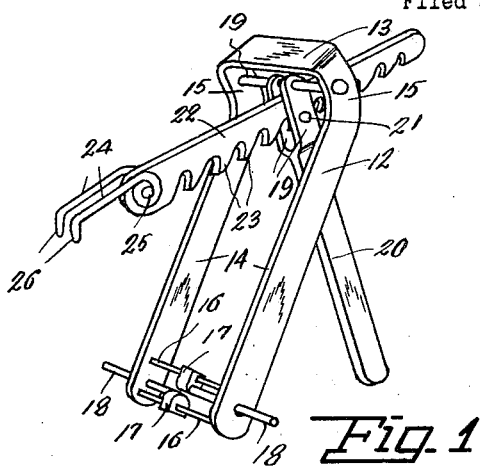
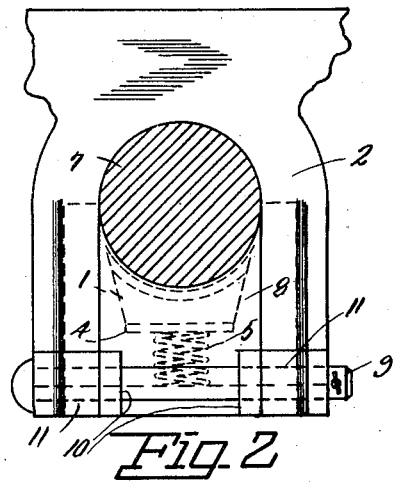
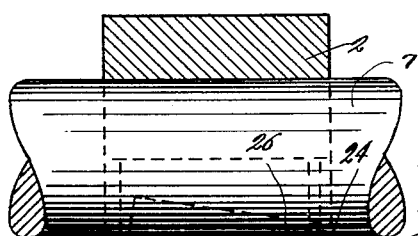
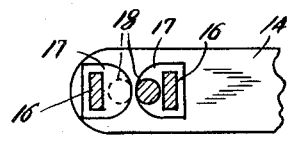
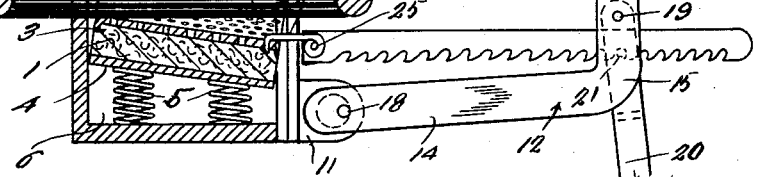
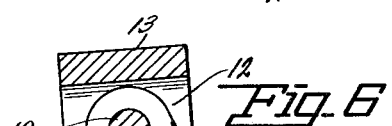
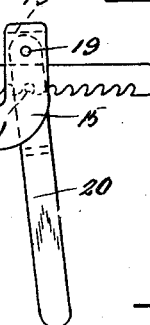
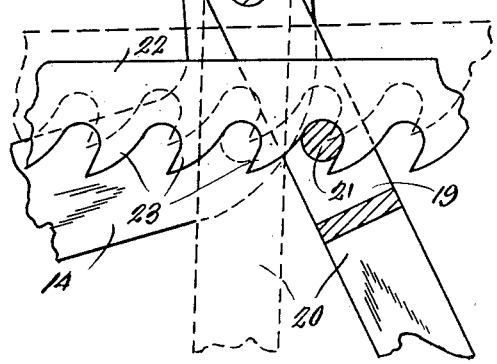
INVENTOR
Leo F. Price
BY
ATTORNEY Patented Oct. 12, 1948

2,451,117

UNITED STATES PATENT OFFICE 2,451,117

PULLING APPARATUS

Leo F. Price, Spokane, Wash.

Application July 30, 1945, Serial No. 607,858

3 Claims. (Cl. 29—267)

1

This invention relates to a grease block puller and it is one object of the invention to provide a device by use of which a grease block in a locomotive bearing may be very easily extracted from the bearing after it becomes worn to such an extent that it is necessary to replace it with a new block of grease.

Another object of the invention is to provide a device adapted to be applied to the outer end or front of a bearing and a grapple constituting an element of the device engaged with a sheet of screening embedded in the grease block so that by shifting the grapple longitudinally the block of grease will be withdrawn from the bearing.

Another object of the invention is to provide a grease block puller wherein the grapple is slidably mounted through a fork of a lever pivoted to a frame adapted to be detachably connected with the outer end of the bearing, the grapple having rack teeth for engagement by a cross pin of the lever so that by rocking the lever the grapple may be shifted outwardly in step by step movements for withdrawing the grease block.

Another object of the invention is to provide a grease block puller which is simple in construction, easy to apply and operate, and not liable to become broken.

The invention is illustrated in the acompanying drawings wherein:

Fig. 1 is a perspective view of the improved grease block puller.

Fig. 2 is a view looking at the bearing from which a grease block is to be removed.

Fig. 3 is a view showing the bearing in section and the improved puller in position for use.

Fig. 4 is a sectional view taken through the inner or front end portion of the frame of the puller along line 4—4 of Figure 5.

Fig. 5 is a top plan view of the front end portion of the frame.

Fig. 6 is a fragmentary sectional view upon an enlarged scale taken through the rear portion of the frame and the pivoted lever.

The improved device is employed for removing a grease block 1 from the bearing 2 of a locomotive engine but may be put to other uses for which it is found suitable. The grease block has embedded in it a screen 3 which may be wire mesh, a plate of perforated metal or other suitable material and at its bottom is a metal plate 4 which constitutes a support for the grease block and rests upon springs 5. The springs rest upon the bottom of the chamber 6 of the bearing and urge the plate 4 and the grease block upwardly

2 so that it is squeezed through the screen 3 and has engagement with the under portion of the shaft 7. When the grease block has been worn to such thinness that a new one is needed it must be withdrawn through the open front of the chamber and a new one substituted. This is done by means of the improved puller constituting the subject matter of this invention, the door 8 being removed after withdrawing the pin 9 from the ears 10 of the door and the ears 11 of the bearing.

This puller has a frame 12 formed of strong metal, and referring to Figure 1 it will be seen that the metal strip from which the frame is formed is bent to provide a U-shaped frame having a bridge 13 and side arms 14 which are spaced transversely from each other and adjacent the bridge are formed with curved portions 15 which cause the bridge to be offset from the plane of the arms as shown clearly in Figures 3 and 6. Bars 16 are mounted between front ends of the side arms 14 and these bars carry blocks 17 which are slidable along the bars and carry rods or pins 18 which pass through openings in the side arms and project outwardly therefrom so that they may be moved through openings of the ears 11 and pivotally connect the frame with these ears. A rod 19 is mounted between the bent end portions of the side arms adjacent the bridge 13 and this rod passes through openings in the forks 19 of a lever 20 to pivotally mount the lever. A pin 21 is mounted between the forks 19 in such position that a bar 22 having teeth 23 along its lower edge may be passed through the forked end of the lever between the rod 19 and the rod 21. At its front end the bar 22 carries hooks 24 which are pivoted to the bar 22 by a pin 25 and have bills 26 for engaging through openings of the screen 3 and connect the hooks with the screen. After the hooks have been engaged with the screen the lever may be rocked back and forth along the bar and as it swings forwardly the pin 21 will ride over the curved edges of the teeth and engage in the pockets in front of the teeth so that as the lever is swung rearwardly pull will be exerted upon the bar and the bar shifted rearwardly. This is repeated until the grease block has been extracted from the chamber of the bearing and a new block may then be fitted into the bearing and rest upon the plate 4. The rods or pins 18 will then be retracted and the frame removed from its position between the ears 11 so that the door 8 may be replaced and closed.

Having thus described the invention, what is claimed is:

1. A grease block puller comprising a frame having side arms and a bridge, bars extending between the side arms adjacent free ends thereof, blocks slidable along said bars, rods carried by said blocks and passing through openings in the side arms for movement with the blocks from a retracted position to an extended position for passing through ears of a bearing house and connecting the frame with the bearing house across an open front thereof, a mounting rod extending between the side arms adjacent the bridge, a lever having a forked end pivoted to the mounting rod, a pin carried by the forked end of said lever and spaced from the mounting rod, a draw bar passing through the forked end of said lever and having a toothed lower edge resting upon said pin, and hooks pivotally mounted at the front end of said draw bar and extending forwardly therefrom with their front ends bent to form bills for engaging through a screen of a grease block.

2. A grease block puller comprising a frame having side arms spaced transversely of the frame, bars mounted between said arms, blocks slidable along said bars, rods carried by said blocks and extending transversely of the frame in opposite directions and through the arms for movement from a retracted position to an extended position for engaging through ears of a bearing casing and mounting the frame outwardly of an open front of the casing, a lever pivotally carried by said frame, a pin carried by said lever and extending transversely thereof, a draw bar slidable across the pin of the lever and having teeth for engagement thereby, and means at the front end of the draw bar for engaging through a screen of a grease block.

3. A grease block puller comprising a frame having side bars, blocks between the side bars slidable transversely of the frame, rods carried by said blocks and extending transversely of the frame in opposite directions and through the side bars for movement with the blocks from a retracted position to an extended position for engaging through ears of a bearing casing and removably mounting the frame outwardly of an open front of the casing, a draw bar in said frame slidable longitudinally and having means at its front end for engaging a screen of a grease block and means for shifting the draw bar longitudinally and imparting pulling force thereto for withdrawing the screen from the bearing casing.

LEO F. PRICE.

REFERENCES CITED

The following references are of record in the file of this patent:

UNITED STATES PATENTS

| Number | Name | Date |
|---|---|---|
| 1,537,812 | Erickson | May 12, 1925 |
| 1,610,969 | Robertson | Dec. 14, 1926 |
| 1,596,464 | Smith | Aug. 17, 1926 |